No. 713,773. Patented Nov. 18, 1902.
J. S. KEMP.
DRAFT EQUALIZER.
(Application filed July 26, 1902.)
(No Model.)
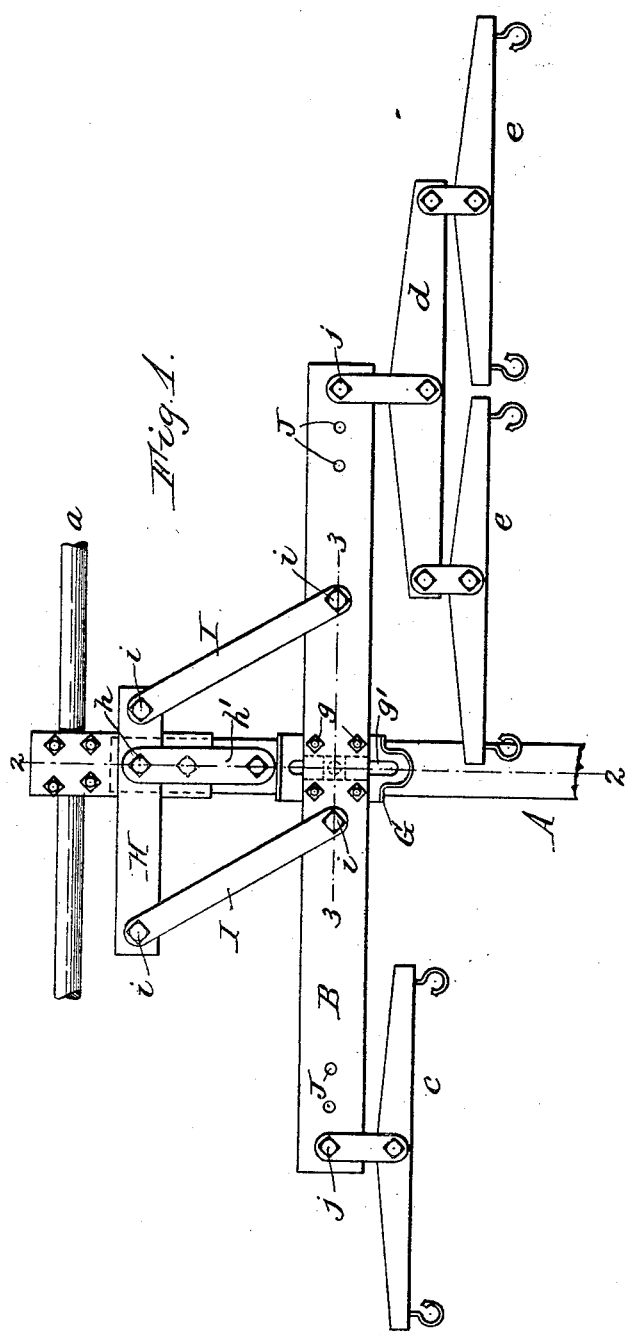
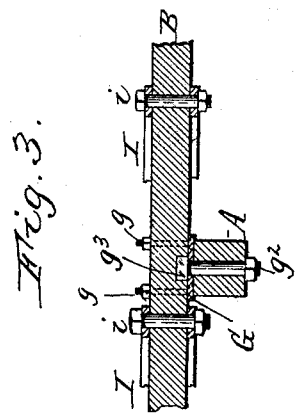
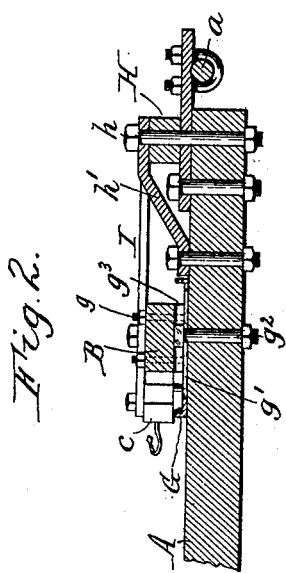

UNITED STATES PATENT OFFICE.

JOSEPH SARGENT KEMP, OF NEWARK VALLEY, NEW YORK.

DRAFT-EQUALIZER.

SPECIFICATION forming part of Letters Patent No. 713,773, dated November 18, 1902.

Application filed July 26, 1902. Serial No. 117,116. (No model.)

*To all whom it may concern:*

Be it known that I, JOSEPH SARGENT KEMP, a citizen of the United States, residing at Newark Valley, in the county of Tioga and State of New York, have invented new and useful Improvements in Draft-Equalizers, of which the following is a specification.

This invention relates to a draft-equalizer for agricultural implements, harvesting-machines, vehicles, and other devices of that kind provided with whiffletrees arranged for hitching three draft-animals abreast.

The object of the invention is to provide a strong and desirable draft-equalizer constructed of the minimum number of parts which will nicely even the draft of the animals and materially reduce the side draft on the tongue.

Another object is to so construct the equalizer that the single animal on one side of the tongue can be hitched close to the latter, thus avoiding the employment of a long lever projecting a considerable distance to the side of the tongue.

In the accompanying drawings, Figure 1 is a plan view of a portion of a tongue and axle provided with a draft-equalizer embodying the invention. Fig. 2 is a longitudinal section thereof in line 2 2, Fig. 1. Fig. 3 is a fragmentary transverse section through the draft-bar and tongue in line 3 3, Fig. 1.

Like letters of reference refer to like parts in the several figures.

A represents the tongue or pole, and $a$ the axle of the vehicle or other device, to which the rear end of the tongue is attached in any suitable manner.

B represents a transverse draft-bar, to which is connected on one side of the tongue the singletree $c$ for the single draft-animal and on the other side of the tongue the doubletree $d$. The latter is connected at its center to the draft-bar and carries at its opposite ends the singletrees $e$ for the two animals which are hitched on the same side of the tongue. The draft-bar is connected to the tongue so as to have a longitudinal sliding and pivotal or swinging movement relative to the tongue. The connection shown in the drawings, which is a simple and strong one, is constructed as follows:

G represents a metal plate or casting which is securely attached by bolts $g$ or otherwise to the under side of the draft-bar and rests loosely on the top of the tongue. The plate is slotted longitudinally at $g'$, and through this slot projects the upper end of a fixed vertical bolt $g^2$, which passes through the tongue. The under side of the draft-bar is provided above the slot in the plate with a transverse groove or channel $g^3$, in which the head on the upper end of the bolt slidably engages.

H represents an equalizing-lever which is fulcrumed in rear of the draft-bar and as near as convenient to the axle. Preferably the lever is pivoted on a fixed fulcrum pin or bolt $h$, which extends vertically through holes in the tongue and equalizing-lever.

$h'$ represents an ordinary brace-bar, the rear end of which engages over the upper end of the fulcrum-bolt and the forward end of which inclines toward and is bolted to the tongue. The equalizing-lever has a long arm, which projects to that side of the tongue on which the single animal is located, and a short arm, which extends to the other side of the tongue. The arms of the equalizing-lever are connected to the draft-bar on opposite sides of the tongue by links or rods I, which are pivoted or loosely connected by bolts or the like $i$ to the draft-bar and equalizing-lever. The links are preferably parallel and inclined, so that one link connects to the short arm of the equalizing-lever and diverges forwardly away from the tongue, while the other link inclines forwardly toward the tongue. By this arrangement of the parts the single animal on one side of the tongue is given a leverage equal to that of the two animals on the other side of the tongue and the draft-bar is maintained substantially at right angles to the tongue, so as to even or equalize the draft on opposite sides of the latter and eliminate any material side draft. The draft on opposite sides of the tongue can be preferably proportioned by shifting the singletree or doubletree on the draft-bar nearer to or farther from the tongue. For this purpose each end of the draft-bar is provided with a plurality of holes J, in which the attaching-bolts $j$ for single or double trees can be secured. A similar result can also be accomplished by providing the equalizing-lever with a plurality of pivot-bolt holes and shifting the lever relatively to increase and decrease its short and long arms or by shifting the ends of the links connecting the draft-bar and equalizing-lever nearer to or farther from the tongue.

The equalizer is nicely adapted for two animals of unequal strength. When used for two animals, the doubletree is replaced by a singletree, the two singletrees of the equalizing-lever being properly adjusted to suit the uneven draft.

I claim as my invention—

1. In a draft-equalizer, the combination of a tongue, a transverse draft-bar pivoted at its middle and capable of moving lengthwise on said tongue, a doubletree and a singletree connected to opposite ends of said drawbar, an equalizing-lever having arms of unequal length and arranged with its short arm in rear of said doubletree, a connection extending from said short arm to said draft-bar and attached to the latter between the pivot thereof and the doubletree, and a connection extending from the long arm of the equalizing-lever to the draft-bar on the opposite side of the pivot of the latter, substantially as set forth.

2. In a draft-equalizer, the combination of a tongue, a transverse draft-bar pivoted at its middle and capable of moving lengthwise on said tongue, a doubletree and a singletree connected to opposite ends of said drawbar, an equalizing-lever having arms of unequal length and arranged with its short arm in rear of said doubletree, a link extending from said short arm forwardly and outwardly to said draft-bar, and a link extending from the long arm of said equalizing-lever forwardly and inwardly to said draft-bar, substantially as set forth.

3. In a draft-equalizer, the combination of a tongue, a draft-bar mounted to swing and slide longitudinally on said tongue, said bar projecting substantially equal distances on opposite sides of said tongue, a doubletree connected to said bar on one side of the tongue, a singletree connected to said bar on the opposite side of the tongue, an equalizing-lever fulcrumed on the tongue in rear of said draft-bar and having unequal arms projecting to opposite sides of the tongue, and substantially parallel links connecting said lever and said draft-bar on opposite sides of the tongue, substantially as set forth.

4. The combination of a tongue, a draft-bar, a plate fixed to said draft-bar, a bolt secured to the tongue and working in a longitudinal slot in said plate, whiffletrees connected to said draft-bar, an equalizing-lever fulcrumed on the tongue in rear of said draft-bar, and means connecting said draft-bar and lever on opposite sides of the tongue, substantially as set forth.

Witness my hand this 24th day of July, 1902.

JOSEPH SARGENT KEMP.

Witnesses:
THOMAS MAHAR,
W. B. ELWELL.